US010516572B2

(12) United States Patent
Toillon et al.

(10) Patent No.: US 10,516,572 B2
(45) Date of Patent: Dec. 24, 2019

(54) COMMUNICATIONS NETWORK

(71) Applicant: SAFRAN ELECTRONICS & DEFENSE, Boulogne Billancourt (FR)

(72) Inventors: Patrice Toillon, Boulogne Billancourt (FR); Francois Guillot, Boulogne Billancourt (FR)

(73) Assignee: SAFRAN ELECTRONICS & DEFENSE, Boulogne Billancourt (FR)

(*) Notice: Subject to any disclaimer, the term of this patent is extended or adjusted under 35 U.S.C. 154(b) by 7 days.

(21) Appl. No.: 16/062,021

(22) PCT Filed: Dec. 12, 2016

(86) PCT No.: PCT/EP2016/080656
§ 371 (c)(1),
(2) Date: Jun. 13, 2018

(87) PCT Pub. No.: WO2017/114651
PCT Pub. Date: Jul. 6, 2017

(65) Prior Publication Data
US 2019/0312777 A1  Oct. 10, 2019

(30) Foreign Application Priority Data
Dec. 28, 2015 (FR) ...................... 15 63376

(51) Int. Cl.
*H04L 12/28* (2006.01)
*H04L 12/24* (2006.01)
*H04L 29/08* (2006.01)

(52) U.S. Cl.
CPC .......... *H04L 41/0823* (2013.01); *H04L 12/28* (2013.01); *H04L 29/08* (2013.01); *H04L 67/12* (2013.01)

(58) Field of Classification Search
CPC ... G06F 9/44505; H04L 67/12; H04L 12/437; H04L 41/082; H04L 29/08; H04B 7/18506; H04B 1/0064; H04B 7/18508
See application file for complete search history.

(56) References Cited

U.S. PATENT DOCUMENTS 9,019,977 B2 * 4/2015 Baphna ............... H04L 41/0803
                                                              370/409
2015/0100774 A1    4/2015 Lopez et al.

OTHER PUBLICATIONS

Li et al. "A Genetic Algorithm Based Configuration Optimization Method for AFDX", IEEE, Aug. 6, 2014, pp. 440-444, 2014 1Oth International Conference on Reliability, Maintainability and Safety (ICRMS).

* cited by examiner

*Primary Examiner* — Chirag R Patel
(74) *Attorney, Agent, or Firm* — Muncy, Geissler, Olds & Lowe, P.C.

(57) ABSTRACT

The invention provides a communications network comprising at least two modules and a common switch connected firstly to the two modules and secondly to various different user terminals, the switch having as many configurations as there are user terminals and modules connected to the switch, each user terminal and each module being associated with a particular dedicated configuration.

10 Claims, 3 Drawing Sheets

COMMUNICATIONS NETWORK

The invention relates to a communications network, and particularly but not exclusively to a communications network for aircraft.

TECHNOLOGICAL BACKGROUND OF THE INVENTION

In the field of aviation, communications networks serve to convey communications that are internal to an airplane, which communications serve mainly to exchange data between various elements of the avionics or even within a single element of the avionics.

Usually, a communications network has modules (computers, processors, . . . ) that are put into communication with user terminals via switches in order to exchange data within a given module or between a module and a user terminal, the switches being configured to monitor and distribute the various data frames of the various logical channels of the network on the basis of configuration tables containing the characteristics specific to each logic channel and to each outlet port associated with the switch in question.

FIG. 1 is a diagram of a prior art communications network. In that communications network, a first switch 1 controls both exchanges of data between the various portions of a given first module 2 and also exchanges of data between said first module 2 and a second switch 3 (drawn with continuous lines). The second switch 3 serves to control exchanges of data (drawn with bold continuous lines) between the first switch 1 and user terminals (not shown). In the same manner, a third switch 4 controls both exchanges of data between the various portions of a given second module 5 and also exchanges of data between said second module 5 and the second switch 3 (drawn in continuous lines). The second switch 3 thus also controls exchanges of data (drawn with bold continuous lines) between the third switch 4 and user terminals.

Each module 2, 5 thus requires the presence of a dedicated switch 1, 4 to put it into communication with another switch 3 that may possibly be shared in common with other modules. The presence of two switches in cascade for each module is necessary, specifically to ensure independence for data exchanged firstly within a given module (a portion of data drawn using dashed lines in FIG. 1) and secondly outside the module with user terminals (a portion of data represented by chain-dotted lines).

Such a communications network thus presents an architecture that is relatively burdensome and that includes in particular a large number of switches.

OBJECT OF THE INVENTION

An object of the invention is to propose a communications network that presents an architecture that is simplified.

BRIEF SUMMARY OF THE INVENTION

In order to achieve this object, there is provided a communications network comprising at least two modules and a common switch connected firstly to the two modules and secondly to various different user terminals, the switch having as many configurations as there are user terminals and modules connected to the switch, each user terminal and each module being associated with a particular dedicated configuration, each configuration associated with a user terminal including:

- a first configuration table that characterizes private exchanges between the first module and the switch and that is common to all of the configurations associated with the user terminals and also with the configuration associated with the first module;
- a second configuration table that characterizes private exchanges between the second module and the switch and that is common to all of the configurations associated with the user terminals and also with the configuration associated with the second module; and
- at least one third configuration table that characterizes exchanges between the switch and the user terminal associated with the configuration under consideration and that is specific to said configuration;

the configuration associated with the first module having the first configuration table and the configuration associated with the second module having the second configuration table.

Thus, because of the particular structuring of the switch as various different configurations, each associated with one of the modules or with one of the user terminals, and because of the various different configuration tables being integrated within each of said configurations, a single shared switch enables data to be exchanged within a given module, with this applying to each module, and also between each of the modules and the user terminals, while still ensuring independence of the exchanged data. The switch structured in this way can accommodate a plurality of configurations simultaneously without disturbance between the data streams (or possibly with some disturbance, but that disturbance being under control).

Advantageously, the particular structure of the switch enables each user to modify that user's own terminal characteristics and parameters without that involving reconfiguring the entire switch. Specifically, it suffices merely to modify the configuration associated with that user, which does not lead to any modification of the other configurations.

In a particular embodiment, the switch is arranged so that each configuration of the user terminals is made up of sub-configurations.

In another particular embodiment, the switch is arranged so that each sub-configuration of a given configuration is associated with a particular standardized type of communication between the switch and the associated user terminal.

In a particular embodiment, for at least one given configuration, at least one sub-configuration is associated with Ethernet communication and at least other sub-configuration is associated with A664 communication.

In a particular embodiment, at least one given output port of the switch is common to various different user terminals.

In a particular embodiment, the switch is arranged in such a manner that the output port is connected to as many virtual ports internal to the switch as there are user terminals connected to said output ports, each virtual port being associated with a respective user terminal, each virtual port being governed by a local relationship for data frame output over said virtual ports, the switch also having a control member for controlling the virtual ports connected firstly to the various different virtual ports and secondly to the output port and managing the outputting of data frames over the output port by means of an overall output relationship.

In a particular embodiment, the overall output relationship is defined at least by the budget allocated to each virtual port.

In a particular embodiment, the overall output relationship is also defined by a maximum latency allocated to each virtual port.

In a particular embodiment, the switch is arranged to be controllable both in application of individual modes of operation, where each individual mode of operation is associated with a single user, and also in application of an administrator mode of operation.

Figure 1:
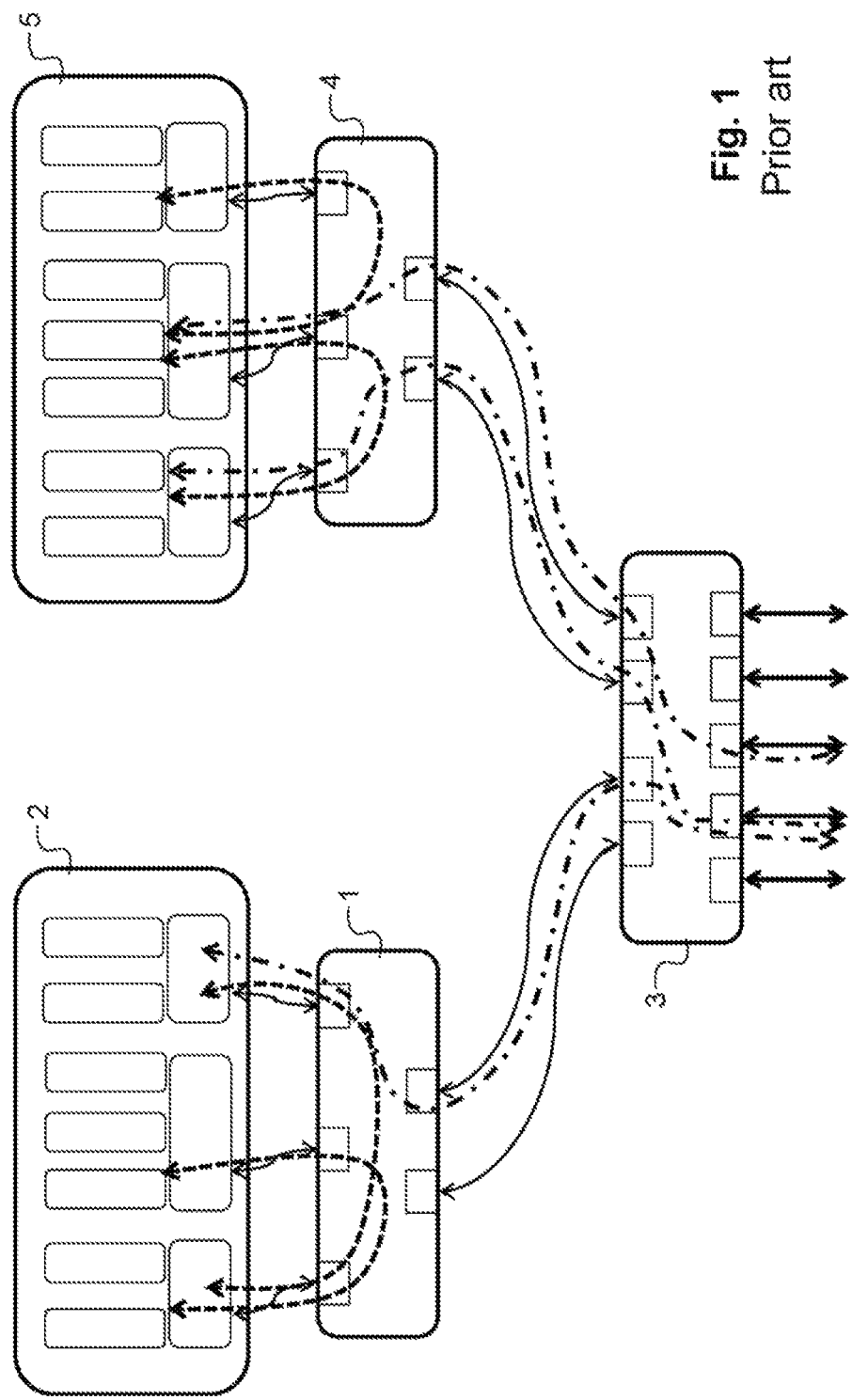
FIG. 1 is described above and is a diagram showing a prior art communications network for aircraft.
Figure 2:
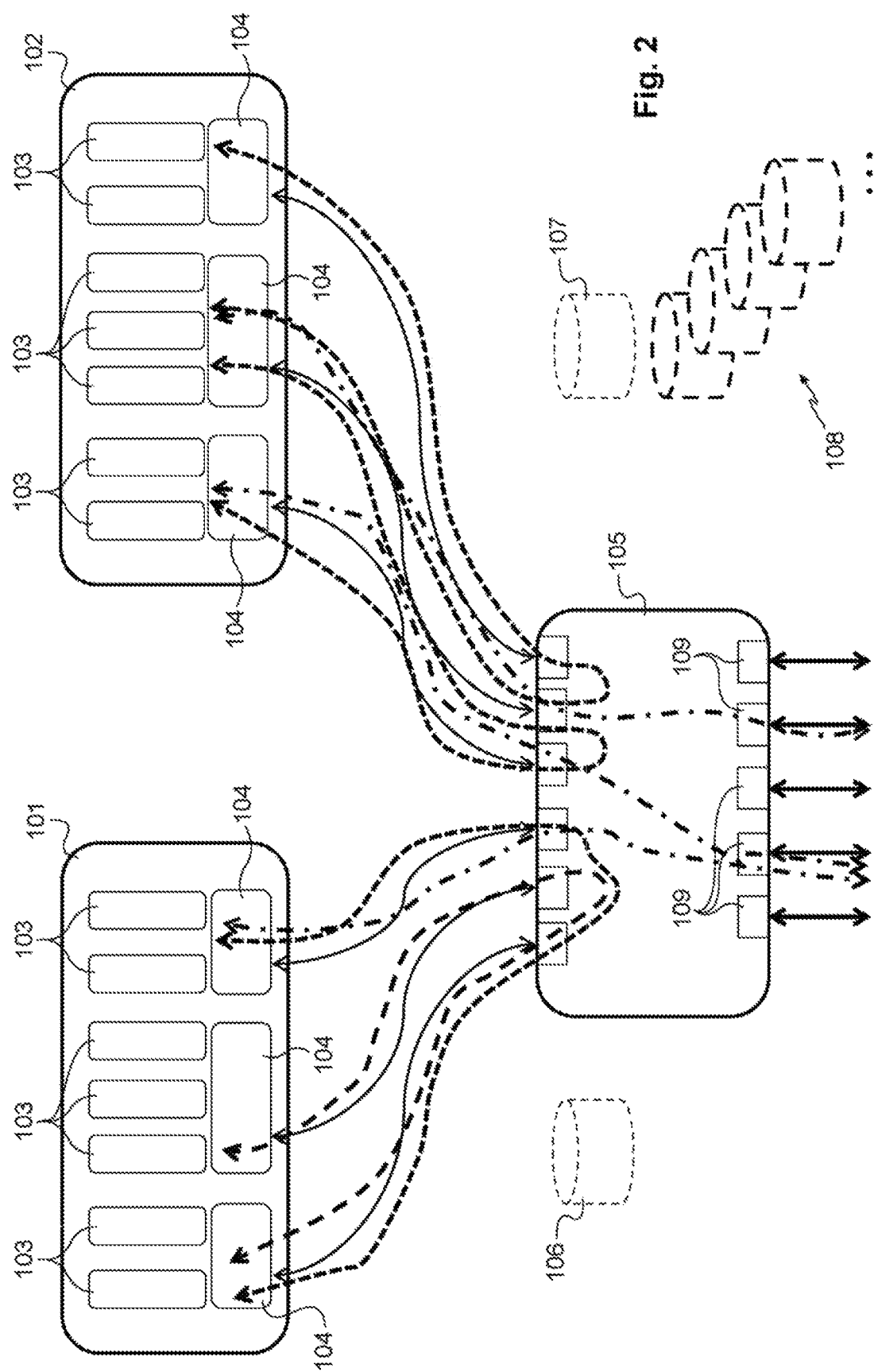
Figure 3:
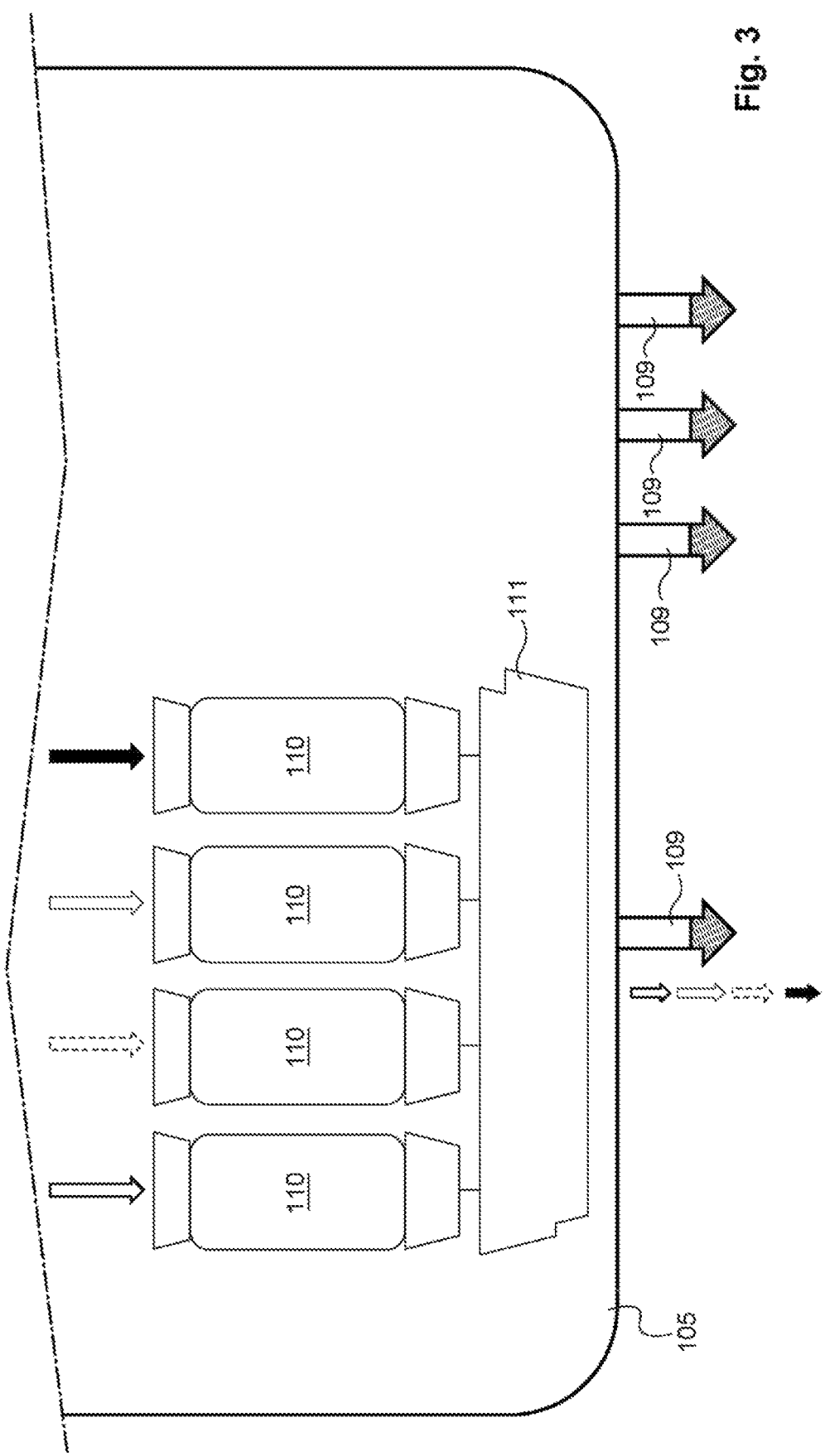

The invention can be better understood in the light of the following description of a non-limiting embodiment of the invention given with reference to the accompanying figures, in which:

FIG. 2 is a diagram of a communications network for aircraft in a particular embodiment of the invention; and FIG. 3 is a diagram showing a portion of the switch in the communications network shown diagrammatically in FIG. 2.

DETAILED DESCRIPTION OF THE INVENTION

With reference to FIG. 2, the communications network in a particular embodiment of the invention is a communications network for aircraft.

In this example, the communications network includes a first module 101 and a second module 102, each associated with an avionics element of the aircraft (not shown). By way of example, each module 101, 102 is a computer or a processor or a set of computers and/or processors. Each module hosts multiple avionics applications/functions 103 that are to be executed, which applications/functions 103 are specific to the avionics element associated with said module. Each module also includes connection units 104, each associated with one or more applications/functions 103 of said module. In this example, the connection units 104 are of the ARINC 664 P7 End System type.

The communications network also includes a switch 105 that is shared firstly between the various modules 101, 102, and secondly between various user terminals (not shown). The switch 105 is thus connected firstly to the connection units 104 of the modules and secondly to the user terminals. Connections between the modules 101, 102, the switch 105, and the user terminals may equally well be wired or wireless.

The switch 105 has a plurality of configurations. The switch 105 thus has as many configurations as there are user terminals and modules connected to the switch 105, each user terminal and each module being associated with a particular configuration dedicated thereto.

The configuration associated with the first module 101 has a single configuration table 106 characterizing exchanges between said first module 101 and the switch 105 (drawn in continuous lines). The configuration associated with the second module 102 also has a single configuration table 107 characterizing exchanges between said second module 102 and the switch 105 (drawn in continuous lines).

These exchanges are thus private. The term "private" is used to mean internal to the module under consideration between the various connection units of said module.

In contrast, each configuration associated with one of the user terminals has a plurality of configuration tables, namely:

the first configuration table 106 characterizing exchanges between the first module 101 and the switch 105 (which is thus identical for all of the configurations associated with the user terminals and with the configuration associated with the first module 101);

the second configuration table 107 characterizing exchanges between the second module 102 and the switch 105 (which is thus identical for all of the configurations associated with the user terminals and with the configuration associated with the second module 102); and at least one additional configuration table 108, which is specific to that configuration and which characterizes exchanges between the switch 105 and the user terminal associated with the configuration under consideration, these exchanges thus being public (where the term "public" is used to mean between various distinct avionics elements of the aircraft including at least one associated with one of the modules).

By way of example, the first configuration table 106 contains the characteristics and the parameters of the logic communication channels of the switch 105 and the characteristics and the parameters enabling connection with the connection units 104 of the first module 101. By way of example, the second configuration table 107 contains the characteristics and the parameters of the logic communication channels of the switch 105 and the characteristics and the parameters enabling connection with the connection units 104 of the second module 102. By way of example, the additional configuration table 108 specific to each configuration contains the characteristics and the parameters of the logic channels of the switch 105 and the characteristics and the parameters of the outlet port of the switch 105.

The switch 105 is thus arranged to present different configurations that are processed independently of one another. In particular, the switch 105 is thus suitable for loading the various configurations in independent manner, thus making it possible to update each configuration in independent manner without modifying the entire architecture and all of the configurations of the switch 105. The switch 105 is also arranged to manage the various configurations simultaneously.

By way of example, such a switch 105 is a so-called A664 switch (i.e. that relies on the ARINC 664 standard) of structure that has been adapted so that the switch 105 can include the various above-mentioned configurations.

In particular manner, each user terminal configuration is also subdivided into sub-configurations, the switch 105 thus being arranged to process the various sub-configurations within a given configuration independently and simultaneously. In this example, each sub-configuration is associated with a particular type of communication. For example, for a given configuration, one sub-configuration is associated with Ethernet communications and another sub-configuration is associated with A664 standard communications.

The distribution in sub-configurations is provided by associating each sub-configuration:

with the first configuration table 106 characterizing exchanges between the first module 101 and the configuration 105;

with the second configuration table 107 characterizing exchanges between the second module 102 and the switch 105; and with an additional configuration table, which is specific to the sub-configuration under question and which characterizes exchanges of the given type of communication of said sub-configuration (Ethernet A664, . . . ) between the switch 105 and the associated user terminal.

In a preferred embodiment, at least one single output port 109 of the switch 105 is common to various different user terminals.

This makes it possible to limit the number of output ports 109 of the switch 105 and thus its size.

With reference to FIG. 3, in particular manner, a single (physical) output port 109 of the switch 105 is common to various different user terminals. For example, said output port 109 is common to four distinct user terminals.

The switch 105 is arranged in such a manner that said output port 109 is associated with as many virtual ports 110 that are internal to the switch 105 as there are user terminals connected to said output port 109, each virtual port 110 being associated with a respective one of the user terminals.

Amongst other things, each virtual port 110 is governed by a local output relationship of the virtual port 110, such as a first-in-first-out relationships, or indeed a relationship of the best effort type. Preferably, each virtual port 110 is independently reconfigurable via the configuration or the sub-configurations of the user terminal associated with said virtual port 110.

For each user terminal, at least some of the logic channels of the switch 105 associated with said user terminal are connected to the virtual port 110 of said user terminal. Thus, for each user terminal, there is a set of logic channels associated with the virtual port 110 of said user terminal, each set being specific to a single user terminal.

The switch 105 also has a control member 111 for controlling the virtual ports 110. The control member 111 is arranged to organize the outputting of data streams over the output ports 109 associated with the four virtual ports 110 as a function of an overall relationships for outputs over the output port 109. The overall output relationship is characterized by the budget allocated to each virtual port 110 (where the term "budget" is used in the present application to mean a maximum data rate that can be output over the output port 109) and by the maximum acceptable latency for each virtual port 110. Preferably, the control member is reconfigurable so that the various allocated budgets and allocated maximum acceptable latencies can be modified.

As a result, sharing of the output port 109 is performed consistently by managing frame transmissions at two consecutive independent levels: a first level that is local to the virtual ports 110 serving to manage frame transmissions using the local relationships associated with each virtual port 110; and a second level that is general at the level of the control member 111, managing frame transmissions coming from the various virtual ports 110 and going go the same outlet port by means of the general relationship.

Each user terminal can thus behave as though it were the only terminal to be in communication with the switch.

Preferably, the switch 105 is arranged to be controllable in various modes of operation: individual modes of operation (each mode of operation being associated with a single user enabling the user to modify that user's own configuration or sub-configurations); and an administrator mode of operation (enabling the general configuration of the switch 105 to be modified).

In the particular situation of a single output port 109 being used by various different user terminals, the individual modes of operation enable each user to modify the resources of the virtual port 110 allocated thereto, such as the local output relationship of said virtual port 110. The administrator mode of operation enables the administrator to manage the control member 111 and thus modify the overall relationships (in particular the budget allocated to each user and the maximum latency allocated to each user).

The invention is not limited to the above description, but on the contrary covers any variant coming within the ambit defined by the claims.

In particular, the communications network may have some other number of modules.

For reasons of redundancy, the network may have a second switch in parallel or a plurality of switches in parallel with the first switch of the communications network.

Furthermore, although the communications network described herein is a communications network for aircraft, the communications network could be used in any other application. For example, the communications network could be applied to vehicles other than an aircraft and could thus be a communications network for an autonomous vehicle or indeed for a ship. In more general manner, the communications network could be used for any application that requires communications at different levels of security.

The invention claimed is:

1. A communications network comprising at least two modules and a common switch connected firstly to the two modules and secondly to various different user terminals, the switch having as many configurations as there are user terminals and modules connected to the switch, each user terminal and each module being associated with a particular dedicated configuration, each configuration associated with a user terminal including in the switch:
   a first configuration table that characterizes private exchanges between the first module and the switch and that is common to all of the configurations associated with the user terminals and also with the configuration associated with the first module;
   a second configuration table that characterizes private exchanges between the second module and the switch and that is common to all of the configurations associated with the user terminals and also with the configuration associated with the second module; and
   at least one third configuration table that characterizes exchanges between the switch and the user terminal associated with the configuration under consideration and that is specific to said configuration;
   the configuration associated with the first module having the first configuration table and the configuration associated with the second module having the second configuration table.

2. The communications network according to claim 1, wherein the switch is arranged so that each configuration of the user terminals is made up of sub-configurations.

3. The communications network according to claim 2, wherein the switch is arranged so that each sub-configuration of a given configuration is associated with a particular standardized type of communication between the switch and the associated user terminal.

4. The communications network according to claim 3, wherein for at least one given configuration, at least one sub-configuration is associated with Ethernet communication and at least other sub-configuration is associated with A664 communication.

5. The communications network according to claim 1, wherein at least one given output port of the switch is common to various different user terminals.

6. The communications network according to claim 5, wherein the switch is arranged in such a manner that the output port is connected to as many virtual ports internal to the switch as there are user terminals connected to said output ports, each virtual port being associated with a respective user terminal, each virtual port being governed by a local relationship for data frame output over said virtual ports, the switch also having a control member for controlling the virtual ports connected firstly to the various different virtual ports and secondly to the output port and managing the outputting of data frames over the output port by means of an overall output relationship.

7. The communications network according to claim 6, wherein the overall output relationship is defined at least by the budget allocated to each virtual port.

8. The communications network according to claim 7, wherein the overall output relationship is also defined by a maximum latency allocated to each virtual port.

9. The communications network according to claim 1, wherein the switch is arranged to be controllable both in application of individual modes of operation, where each individual mode of operation is associated with a single user, and also in application of an administrator mode of operation.

10. The communications network according to claim 1, wherein the communications network is an aircraft communications network.

* * * * *